(12) United States Patent
Groarke et al.

(10) Patent No.: US 10,936,565 B2
(45) Date of Patent: Mar. 2, 2021

(54) SYSTEMS AND METHODS FOR ACCESSING A SUBSCRIBER-BASED SOURCE

(71) Applicant: MasterCard International Incorporated, Purchase, NY (US)

(72) Inventors: Peter Groarke, Dublin (IE); Sharon Amy Rosano, New Canaan, CT (US); Michelle L. Hafner, Chesterfield, MO (US); Sunil Kadam, Dardenne Prarie, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 583 days.

(21) Appl. No.: 15/386,426

(22) Filed: Dec. 21, 2016

(65) Prior Publication Data
US 2018/0174145 A1 Jun. 21, 2018

(51) Int. Cl.
*G06F 16/22* (2019.01)
*G06Q 40/02* (2012.01)
(Continued)

(52) U.S. Cl.
CPC ........... *G06F 16/22* (2019.01); *G06Q 20/102* (2013.01); *G06Q 20/12* (2013.01); *G06Q 20/351* (2013.01);
(Continued)

(58) Field of Classification Search
CPC ...... G06Q 40/00; G06Q 16/22; G06Q 22/102; G06Q 20/12; G06Q 20/351; G06Q 20/4016; G06Q 20/405; G06Q 40/02
See application file for complete search history.

(56) References Cited

U.S. PATENT DOCUMENTS 6,418,436 B1 7/2002 Degen et al.
7,035,872 B2 4/2006 Phillips et al.
(Continued)

OTHER PUBLICATIONS

Affinion Security Center Launches New Web Portal for Businesses to Help Clients Prevent Identity Theft: New Website Offers Customizable Identity Theft Protection Solutions that Help Increase Customer Security and Loyalty, Anonymous. PR Newswire; New York [New York]Jul. 30, 2008. (Year: 2008).*

(Continued)

*Primary Examiner* — Lalita M Hamilton
(74) *Attorney, Agent, or Firm* — Armstrong Teasdale LLP

(57) ABSTRACT

A computer-implemented method for managing access to data stored within a data source is provided. The method includes receiving updated account data including an updated account identifier, and at least one subscription rule for verifying that a merchant is authorized to receive updated account data. The method also includes storing the updated account data and the at least one subscription rule. The method further includes receiving a registration request from a requesting merchant including at least one candidate account identifier and one merchant identifier identifying the requesting merchant, and retrieving the at least one subscription rule after matching the candidate account identifier to the updated account identifier. The method further includes applying the at least one subscription rule to the requesting merchant, determining that the requesting merchant is authorized to receive the updated account data, and transmitting an update response to the requesting merchant including the updated account data.

15 Claims, 4 Drawing Sheets

(51) Int. Cl.
  *G06Q 20/40* (2012.01)
  *G06Q 20/10* (2012.01)
  *G06Q 20/12* (2012.01)
  *G06Q 20/34* (2012.01)
(52) U.S. Cl.
  CPC ....... *G06Q 20/405* (2013.01); *G06Q 20/4016* (2013.01); *G06Q 40/02* (2013.01)

(56) References Cited

U.S. PATENT DOCUMENTS

| | | | |
|---|---|---|---|
| 7,958,050 B2 | 6/2011 | Finch | |
| 8,630,942 B2 | 1/2014 | Felger | |
| 8,868,467 B2 | 10/2014 | Serebrennikov | |
| 8,959,637 B2 | 2/2015 | Brown et al. | |
| 9,256,870 B1 | 2/2016 | Howe | |
| 9,508,057 B2 | 11/2016 | Joa et al. | |
| 2005/0075977 A1 | 4/2005 | Carroll et al. | |
| 2008/0298573 A1* | 12/2008 | Monk | G06Q 10/067 379/189 |
| 2009/0171839 A1* | 7/2009 | Rosano | G06Q 20/102 705/40 |
| 2010/0161486 A1 | 6/2010 | Liu et al. | |
| 2010/0174644 A1 | 7/2010 | Rosano et al. | |
| 2010/0258620 A1 | 10/2010 | Torreyson et al. | |
| 2010/0299230 A1 | 11/2010 | Patterson et al. | |
| 2012/0265683 A1 | 10/2012 | Da Silva et al. | |
| 2012/0296824 A1 | 11/2012 | Rosano | |
| 2014/0032409 A1 | 1/2014 | Rosano | |
| 2014/0172712 A1 | 6/2014 | Petersen et al. | |
| 2014/0195433 A1 | 7/2014 | De Almeida Ferreira Da Silva et al. | |
| 2014/0258099 A1* | 9/2014 | Rosano | G06Q 20/409 705/39 |
| 2014/0337215 A1 | 11/2014 | Howe | |
| 2014/0365368 A1 | 12/2014 | Rosano et al. | |
| 2016/0125405 A1 | 5/2016 | Alterman et al. | |
| 2016/0171502 A1 | 6/2016 | Maenpaa | |
| 2016/0180368 A1* | 6/2016 | Booth | G06Q 30/0226 705/14.27 |
| 2016/0203484 A1 | 7/2016 | Blinov | |
| 2016/0277412 A1 | 9/2016 | Streuter et al. | |
| 2016/0283938 A1 | 9/2016 | Streuter et al. | |
| 2016/0283940 A1 | 9/2016 | Streuter | |

OTHER PUBLICATIONS

U.S. Appl. No. 15/331,601, filed Oct. 21, 2016.
U.S. Appl. No. 15/331,538, filed Oct. 21, 2016.
PCT International Search Report and Written Opinion, Application No. PCT/US2017/063555, dated Feb. 9, 2018, 12 pps.

* cited by examiner

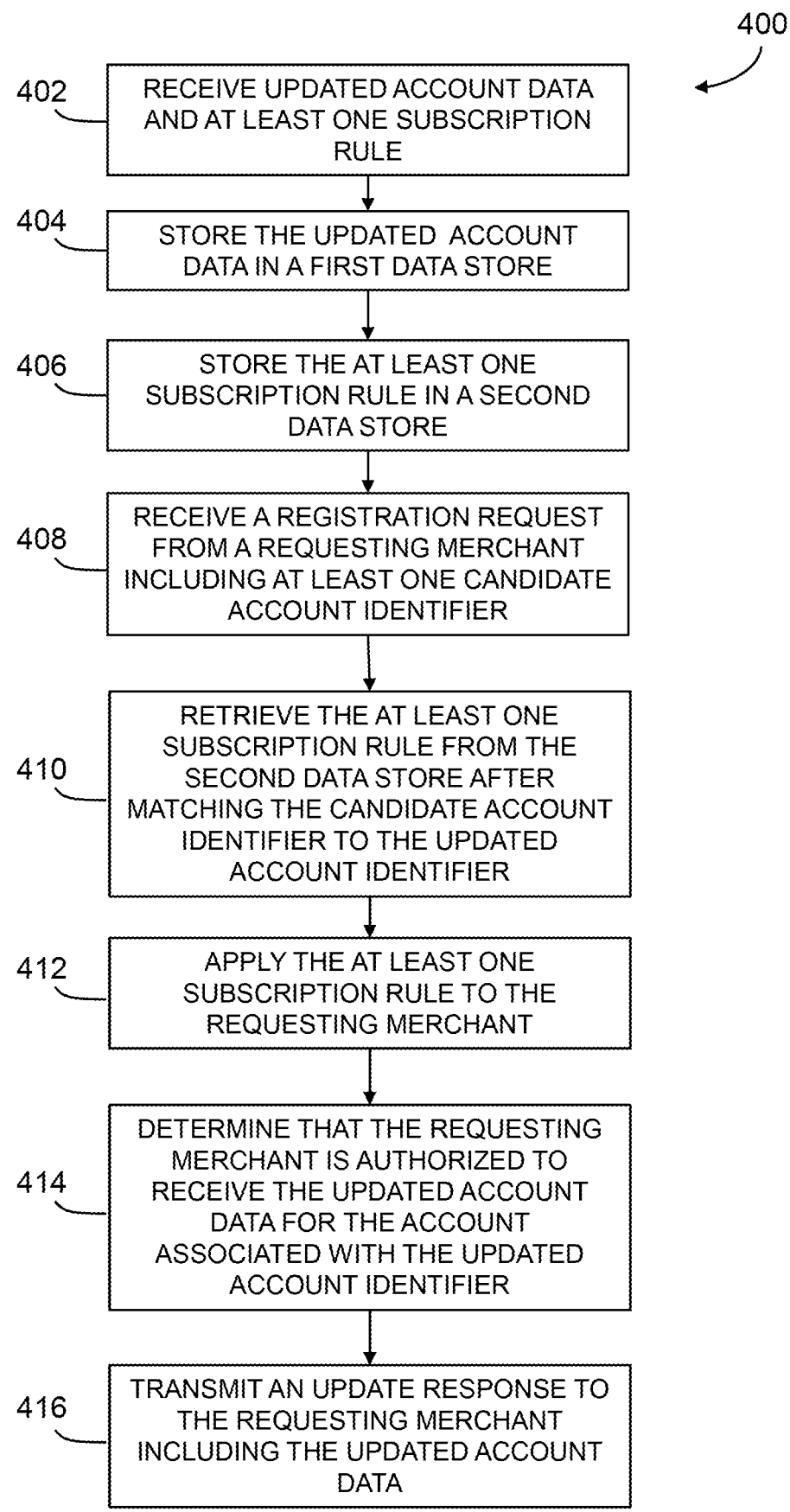

SYSTEMS AND METHODS FOR ACCESSING A SUBSCRIBER-BASED SOURCE

BACKGROUND

The field of the disclosure relates generally to accessing a subscriber-based data source, and, more particularly, to network-based systems and methods for managing access to data stored within a data source based on certain subscription rules.

Electronic data is typically stored within databases. Databases may be in multiple locations within a computer network and accessed by different people using computing devices coupled in communication with the databases. For example, data may be stored in a database at a first location within a network while the same data is also stored in another database at a second location. In some cases, data stored in the first location may become outdated or stale when the same data is updated at the second location. In at least some of these cases, it is important to update the data stored in the first location with the updated data that is stored at the second location. However, there are many challenges associated with updating such outdated or stale data especially when such data may be stored in multiple locations and must be kept secured, such that only those parties that are approved to access the data are actually able to access the data.

The payment card industry is an example where data stored within certain databases must be kept secured. For example, at least some payment transactions are performed where the accountholder makes a purchase, but the physical payment card is not present for the merchant to inspect when the purchase is made. These transactions are known as "card-not-present" (CNP) transactions. In such transactions, information regarding the payment card, including an account number and, in many instances, an expiration date for the payment card is transmitted from a merchant, along with an indicator that the transaction is a CNP transaction. An "account-on-file" transaction is a type of transaction in which the merchant stores information regarding the accountholder's payment card in a database, then retrieves the stored payment card information and includes it in an authorization request message submitted when processing the transaction. One specific type of account-on-file transaction is a "recurring payment transaction," which a merchant initiates on a recurring basis for a particular accountholder. In such recurring payment transactions, the merchant stores information regarding the accountholder's payment card in a database, then retrieves the stored payment card information and includes it in each recurring authorization request message.

An example of a recurring card-on-file payment transaction is a gym membership. Rather than mailing a monthly check for membership with a gym, an accountholder might choose to register a payment card, such as a credit card, a debit card, or a prepaid card, with the gym. Registering the payment card with the gym enables the gym to automatically charge the payment card for the monthly dues on a particular day each month. In some such systems, the merchant stores an account number, an expiration date, and/or other information associated with the payment card and/or accountholder. Given the convenience of this payment model for both merchants and accountholders, it finds use in many other scenarios where an accountholder is a member of a club or subscriber of products or services. Accordingly, multiple merchants may have stored payment card information for the same accountholder. Likewise, any given merchant may have stored payment card information for multiple accountholders.

In addition to recurring payment transactions, merchants may also maintain account-on-file information to facilitate payment card transactions by repeat customers. For example, an online merchant may allow a shopper to create an online account and store account data corresponding to one or more methods of payment. When the shopper is ready to check out and complete a purchase, the shopper may simply select one of the stored payment methods as opposed to having to re-enter their payment card information.

A downside of storing payment card information, however, is that information regarding a payment card is subject to change. For example an accountholder's payment card might expire, causing a new payment card to be issued with a new expiration date while the card number remains the same. In such instances, an authorization request message containing the outdated expiration date is denied by the issuer of the payment card. As a result, the merchant that originally submitted the authorization request is prevented from successfully obtaining payment until the merchant acquires the updated expiration date for the payment card. Due to wide adoption of the account-on-file payment model by merchants and accountholders, it is understandably difficult for an accountholder to update each merchant with new payment card expiration dates. Likewise, it reduces the benefits of the account-on-file payment model to require a merchant to inquire with each accountholder for an updated payment card expiration date prior to submitting each payment authorization request.

In light of the foregoing, at least some known systems may provide merchants with updated accountholder payment card information. However, to obtain the updated account data in such systems, a merchant must submit an account query corresponding to one or more payment card accounts to the merchant's acquiring bank which then forwards the query to a central account data system. In response to the query, the account data system retrieves corresponding account data received from an issuer and transmits the retrieved account data to the acquiring bank. The acquiring bank may then forward the retrieved account data to the merchant, which may then update its database of account-on-file payment card information.

These known systems are limited in several ways. For example, these known systems do not guarantee that a merchant has authorization to access the updated information. In these known systems, as long as the acquiring bank registers the merchant with the central system, the merchant may submit an account query and receive updated account information, even on account information that has not been registered and authorized by the accountholder with the merchant. This limitation may lead to fraud issues. Similarly, these known systems do not police the submitted merchant account queries for flagged merchants that are potentially fraudulent and/or knowingly fraudulent. Also, these known systems may not transmit the updated information to a merchant in a timely manner. In at least some cases, it can take several days for the updated information to be transmitted to the merchant. In light of the foregoing, an enhanced account data system is needed, wherein the enhanced systems and methods address these problems and others.

BRIEF DESCRIPTION OF THE DISCLOSURE

In one aspect, a computer-implemented method for managing access to data stored within a data source is provided.

The method is implemented using a subscriber account-on-file billing updater (ABU) computing device in communication with one or more memory devices. The method includes receiving updated account data including an updated account identifier, and at least one subscription rule for verifying that a merchant is authorized to receive updated account data for an account associated with the updated account identifier. The method also includes storing the updated account data in a first data store and the at least one subscription rule in a second data store. The method further includes receiving a registration request from a requesting merchant including at least one candidate account identifier and one merchant identifier identifying the requesting merchant, and retrieving the at least one subscription rule from the second data store after matching the candidate account identifier to the updated account identifier. The method also includes applying the at least one subscription rule to the requesting merchant, determining that the requesting merchant is authorized to receive the updated account data for the account associated with the updated account identifier, and transmitting an update response to the requesting merchant including the updated account data.

In a second aspect, a subscriber ABU computing device is provided. The subscriber ABU computing device includes one or more processors in communication with one or more memory devices and is configured to receive updated account data including an updated account identifier, and at least one subscription rule for verifying that a merchant is authorized to receive updated account data for an account associated with the updated account identifier. The subscriber ABU computing device is also configured to store the updated account data in a first data store and the at least one subscription rule in a second data store. The subscriber ABU computing device is further configured to receive a registration request from a requesting merchant including at least one candidate account identifier and one merchant identifier identifying the requesting merchant, and retrieve the at least one subscription rule from the second data store after matching the candidate account identifier to the updated account identifier. The subscriber ABU computing device is also configured to apply the at least one subscription rule to the requesting merchant, determine that the requesting merchant is authorized to receive the updated account data for the account associated with the updated account identifier, and transmit an update response to the requesting merchant including the updated account data.

In yet another aspect, a non-transitory computer readable medium having computer-executable instructions embodied thereon is provided. When executed by a subscriber ABU computing device having one or more processors in communication with one or more memory devices, the computer-executable instructions cause the subscriber ABU computing device to receive updated account data including an updated account identifier, and at least one subscription rule for verifying that a merchant is authorized to receive updated account data for an account associated with the updated account identifier. The computer-executable instructions also cause the subscriber ABU computing device to store the updated account data in a first data store and the at least one subscription rule in a second data store. The computer-executable instructions further cause the subscriber ABU computing device to receive a registration request from a requesting merchant including at least one candidate account identifier and one merchant identifier identifying the requesting merchant, and retrieve the at least one subscription rule from the second data store after matching the candidate account identifier to the updated account identifier. The computer-executable instructions cause the subscriber ABU computing device to apply the at least one subscription rule to the requesting merchant, determine that the requesting merchant is authorized to receive the updated account data for the account associated with the updated account identifier, and transmit an update response to the requesting merchant including the updated account data.

BRIEF DESCRIPTION OF THE DRAWINGS

FIGS. 1-4 show example embodiments of the methods and systems described herein.

FIG. 1 is a schematic diagram illustrating a payment platform having a subscriber account-on-file billing updater (ABU) computing device.

FIG. 2 is a diagram illustrating a subscriber ABU system including the subscriber ABU computing device shown in FIG. 1, in communication with the payment processing system of FIG. 1.

FIG. 3 is a diagram illustrating an example of the subscriber ABU computing device shown in FIGS. 1 and 2.

FIG. 4 is a flow chart illustrating an example method for verifying account-on-file information using the subscriber ABU computing device shown in FIGS. 1 and 2 in accordance with one example embodiment of the present disclosure.

DETAILED DESCRIPTION OF THE DISCLOSURE

Figure 1:
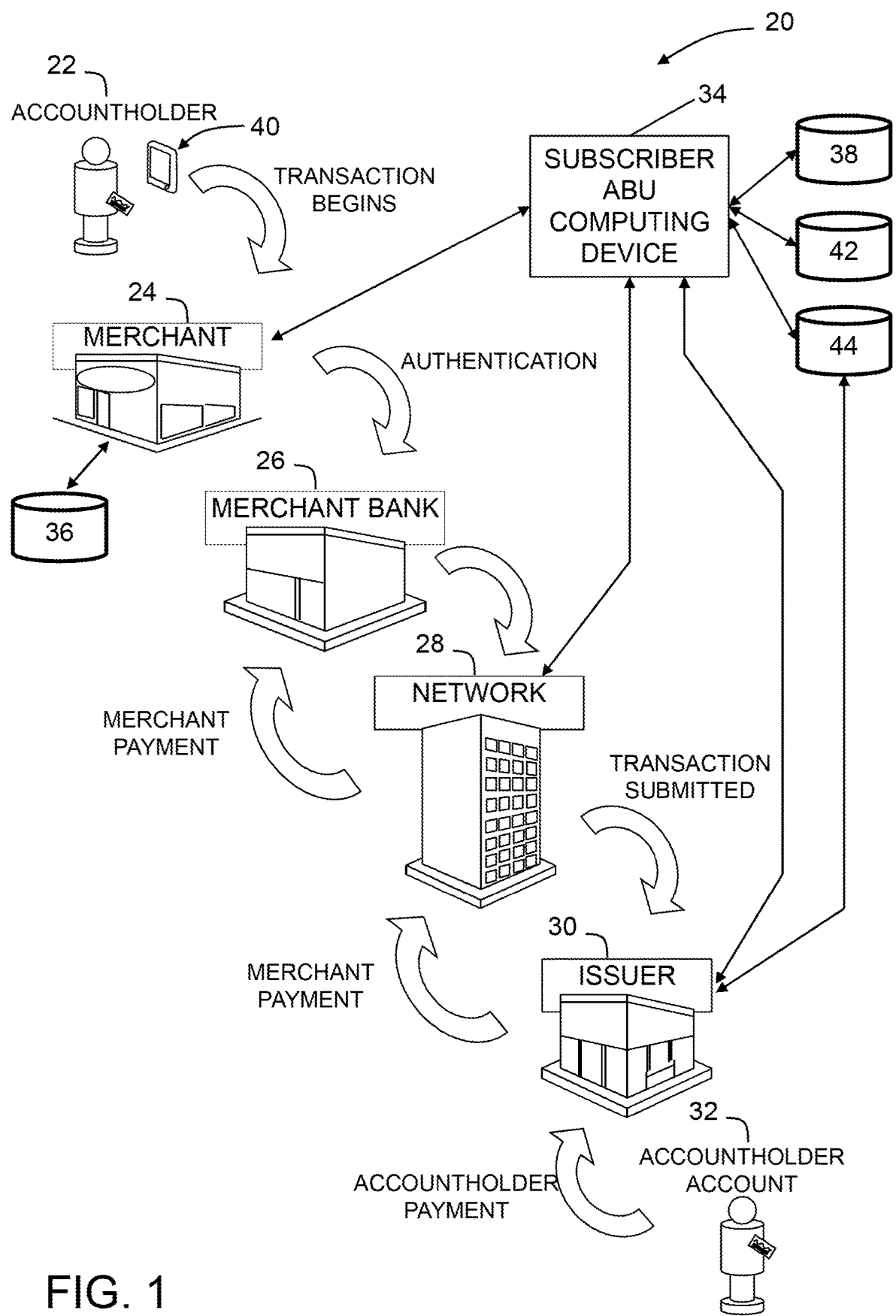

The systems and methods described herein are directed to a subscriber account-on-file billing updater (ABU) system for managing and verifying subscribers, such as registered merchants. The subscriber ABU system is configured to store account data, subscription data, and at least one subscription rule to verify that a merchant is authorized to receive updated account data associated with an accountholder and may be registered to receive such data. The subscriber ABU system includes a subscriber ABU computing device that is configured to perform the steps detailed herein.

In general, the subscriber ABU computing device receives account data from one or more issuers and maintains the account data in an account information data source. The subscriber ABU computing device may then receive subscription data from one or more merchants and/or acquirer banks. The subscriber ABU computing device may also receive subscription rules from an issuer. The subscriber ABU computing device may store the account data, the subscription data, and the subscription rules in a single information data source or in separate information data sources. The subscriber ABU computing device may receive a request from a merchant to be registered to receive updated account data for one or more accounts. The subscriber ABU computing device verifies that the merchant may be registered to receive updated account data by using the one or more subscription rules. Upon verification, the subscriber ABU computing device may allow the merchant to be registered, or the subscriber ABU computing device may deny the merchant's registration and return a response containing a denial. Throughout this process, the subscriber ABU computing device may record subscription data. Additionally, the subscriber ABU computing device may receive subscription rules and also fraud information data for accounts, registered merchants, and merchants requesting registration.

The subscriber ABU computing device may also authenticate that a registered merchant is a valid recipient of updated account data for one or more accounts. The subscriber ABU computing device validates that the registered merchant is authorized to receive updated account data by using one or more subscription rules. Upon validation, the subscriber ABU computing device may transmit the updated account data to the registered merchant, or the subscriber ABU computing device may deny the transmission of the updated account data and may also discontinue the merchant enrollment to receive further updated account data.

In certain embodiments, the subscriber ABU computing device may generate and transmit reports based on the subscription rules applied. In other embodiments, the subscriber ABU computing device may automatically generate and transmit reports on a predetermined event (e.g., receiving updated account data from issuer or a predetermined schedule, such as daily, bi-weekly, etc.). In an alternative embodiment, the subscriber ABU computing device may generate and transmit reports upon request. In certain embodiments, such reports may include updated account information corresponding to an accountholder.

To facilitate policing of merchant registrations, the subscriber ABU computing device may receive subscription rules from one or more issuers. As such, issuers may specify to the subscriber ABU computing device allowed registered merchant behavior and/or provide certain predetermined conditions for allowing registration or retaining registration. In other embodiments, the subscriber ABU computing device may discontinue a registered merchant enrollment within the subscriber ABU system if a predetermined activity occurs or the registered merchant requests to stop enrollment. For example, the subscriber ABU computing device may automatically discontinue merchant enrollment if there is no system activity for six (6) months.

In some embodiments, the issuer may have different subscription rules for specific account ranges. For example, different subscription rules may be applied to high net worth accounts as compared to average net worth accounts, which may be identified by an issuer bank identification number (BIN). The BIN may be provided by the issuer with the account data and received by the subscriber ABU computing device. The subscriber ABU computing device may verify a merchant requesting registration to receive updated data by using the subscription rules selected from a set of subscription rules based on the provided BIN. For example, based on the BIN, at least one range of accounts may verify a merchant requesting registration by determining whether the merchant has prior approved transactions corresponding to the account identifier. If there are prior approved transactions corresponding to the account identifier from the merchant, the merchant is verified and the registration is approved. In another example, the subscriber ABU computing device may automatically register (e.g., auto subscription) a merchant by determining that the merchant has a previously approved authorization message submitted as part of an earlier recurring card-not-present payment transaction. In other words, if an issuer approves a recurring payment authorization request from a merchant on an account, the subscriber ABU computing device will assume the merchant is now registered to said account. In yet another example, the subscriber ABU computing device may verify a registered merchant is authorized to receive updated account data by determining whether the registered merchant update request or automatic update of account data was received beyond a predetermined time period since a last approved transaction corresponding to the account identifier. If the update request or automatic update request of account data exceeds the predetermined time period, the merchant is non-verified, the update request is denied, and the enrollment of the registered may be discontinued.

The subscriber ABU computing device periodically receives account data from one or more issuers and maintains the account data. If a registered merchant or issuer wishes to verify or update its account data, the registered merchant or issuer may submit an update request to the subscriber ABU computing device. In certain embodiments, multiple update requests from one or more registered merchants or issuers may be collected and submitted to the subscriber ABU computing device as a batch. For example, an acquirer bank may collect multiple update requests from one or more merchants and submit the update requests as a batch to the subscriber ABU computing device.

In response to receiving an update request, the subscriber ABU computing device may look up or otherwise retrieve account data from the account information data source. In certain embodiments, account data stored in the account information data source may be stored based on account identifiers and update requests may include one or more registered merchant identifiers, and one or more account identifiers for which a registered merchant is requesting updated account data. To facilitate policing of the currently unregulated update requests, the subscriber ABU computing device may then verify the update request by applying at least one subscription rule and determining that the registered merchant is authorized to receive updated account data. Based on the verification, the subscriber ABU computing device may allow the update request and return an update response containing the updated account data that is transmitted to the authorized registered merchant. Or, the subscriber ABU computing device may deny the update request and generate a denial response stating that the update request is denied. When the update request is denied, the denial response may also provide reason(s) as to why the denial occurred. In either situation, the generated response may also be transmitted to the issuer and/or the registered merchant.

In another embodiment, if a registered merchant or an issuer wishes to verify or update its account data, the subscriber ABU computing device may automatically transmit account updates to the registered merchant or issuer according to a predetermined event. In certain embodiments, multiple account updates may be transmitted to one or more registered merchants or issuers. For example, a registered merchant may receive multiple account updates on a daily basis.

Prior to automatically transmitting the account updates, the subscriber ABU computing device may use one or more subscription rules to determine the predetermined event and verify that the registered merchant receiving the account updates is authorized to receive such updates.

The subscription rules for the subscriber ABU computing device may also be derived from merchant fraud data received from a fraud monitoring source, such as MasterCard® System to Avoid Fraud Effectively (SAFE), MasterCard Expert Monitoring System® (EMS), or any other fraud monitoring source (MasterCard and MasterCard Expert Monitoring System are both registered trademarks of MasterCard International Incorporated located in Purchase, N.Y.) (SAFE and EMS are fraud monitoring products that are offered by MasterCard). The subscriber ABU computing device receives the merchant fraud data from the fraud monitoring source that may include chargeback data and common point data. In certain embodiments, the subscriber ABU computing device verifies a merchant requesting registration using subscription rules derived from the merchant fraud data. For example, the subscription rules may include determining whether a fraud chargeback count derived from the merchant fraud data exceeds a predetermined fraud chargeback count limit. If the fraud chargeback count for that merchant exceeds the predetermined fraud chargeback count limit, the merchant is non-verified and the registration is denied. In another example, the subscriber ABU computing device may determine whether a fraud chargeback percentage derived from the merchant fraud data exceeds a predetermined fraud chargeback percent limit. If the fraud chargeback percentage for the merchant requesting registration exceeds the predetermined fraud chargeback percent limit, the merchant is non-verified and the registration is denied. In a further example, the subscriber ABU computing device may also determine whether the merchant is a common point of fraud, and if so, the merchant is non-verified and the merchant registration is denied.

The subscription rules for the subscriber ABU computing device may further be derived from account fraud data received from the fraud monitoring source, similar to the fraud monitoring sources listed above. The subscriber ABU computing device receives account fraud data from the fraud monitoring source that may include chargeback data, transaction data, average transaction data, and blacklist data. In certain embodiments, the subscriber ABU computing device verifies the merchant requesting registration using subscription rules derived from the account fraud data. For example, the subscription rules may include determining whether the account identifier has a predetermined fraud indicator. If the account identifier has a predetermined fraud indicator then the merchant is non-verified and the merchant registration is denied. In another example, the subscriber ABU computing device determines whether the account identifier is on an account blacklist. If the account identifier is on the account blacklist then the merchant is non-verified and the merchant registration is denied. In a further example, the subscription rules determine whether a date of the account identifier exceeds a predetermined date limit, such that old account identifier cannot be updated by the merchant requesting registration. For example, account identifiers that are more than fifty (50) months old may not be updated by the merchant requesting registration, and, in those cases, the merchant is determined to be non-verified and the registration is denied.

In other embodiments, the subscription rules for the subscriber ABU computing device include receiving merchant feedback data received from an authorization request message corresponding to a payment card transaction between the requester and the issuer. With the payment card transaction, an advice code is typically included that provides instructions from the issuer to the merchant. For example, the issuer may request that the merchant stop maintaining the accountholder's account-on-file information. If so, the subscriber ABU computing device can store this information and use it to verify a merchant requesting registration. For example, the verification may include determining whether a feedback actioned count derived from the stored advice codes exceeds a predetermined feedback action count limit. If the feedback actioned count exceeds the predetermined feedback action count limit, the merchant is non-verified and the registration is denied. In another example, the subscriber ABU computing device may determine whether a feedback actioned percentage derived from the stored advice codes exceeds a predetermined verification feedback actioned percentage limit. If the feedback actioned percentage for the merchant exceeds the predetermined feedback actioned percentage limit, the merchant is non-verified and the registration is denied.

In yet other embodiments, the issuer provides a merchant blacklist to the subscriber ABU computing device that receives and stores the merchant blacklist. The subscription rules may further include determining whether the merchant requesting registration is on the merchant blacklist, and if so, the merchant is determined to be non-verified and the registration is denied.

To reduce the time generating and transmitting update responses, the subscriber ABU computing device allows merchant registration based on merchant data the subscriber ABU computing device receives and stores. Upon registration, merchants are approved to receive updated account data corresponding to accountholders. In certain embodiments, the updated account data is transmitted upon receiving an update request from a merchant. In other embodiments, the subscriber ABU computing device is configured to automatically transmit the updated account data based on a predetermined event. In yet other embodiments, prior to transmitting the updated account data, the subscriber ABU computing device authenticates that the registered merchant is a valid recipient of the updated account data.

The methods and systems described herein may be implemented using computer programming or engineering techniques including computer software, firmware, hardware or any combination or subset thereof, wherein the technical effect is achieved by performing at least one of: (a) receiving updated account data including an updated account identifier, and at least one subscription rule for verifying that a merchant is authorized to receive updated account data for an account associated with the updated account identifier, (b) storing the updated account data in a first data store, (c) storing the at least one subscription rule in a second data store, (d) receiving a registration request from a requesting merchant including at least one candidate account identifier and one merchant identifier identifying the requesting merchant, (e) retrieving the at least one subscription rule from the second data store after matching the candidate account identifier to the updated account identifier, (0 applying the at least one subscription rule to the requesting merchant, (g) determining that the requesting merchant is authorized to receive the updated account data for the account associated with the updated account identifier, and (h) transmitting an update response to the requesting merchant including the updated account data.

The systems and methods described herein provide the technical advantages of (a) reducing the likelihood that account-on-file payment card transactions will be fraudulent; (b) identifying and blocking transmission of updated account data to merchants that may be fraudulent, similarly reducing up-to-date account information from being disseminated; (c) controlling and policing access to ABU systems; (d) increasing issuer participation in ABU systems; and (e) reducing transmission time of up-to-date account information.

Example of Payment Card Transaction Network

FIG. 1 is a schematic diagram illustrating a payment platform 20 that includes a subscriber ABU computing device 34. Embodiments described herein may relate to a transaction card system, such as a payment card payment system using the MasterCard® interchange network. The MasterCard® interchange network is a set of proprietary communications standards promulgated by MasterCard International Incorporated for the exchange of financial transaction data and the settlement of funds between financial institutions that are associated with MasterCard International Incorporated. (MasterCard is a registered trademark of MasterCard International Incorporated located in Purchase, N.Y.).

In a typical transaction card system, a financial institution referred to as the "issuer" or "issuing bank" issues a transaction card, such as a credit card, debit card, and the like, to an accountholder 22, also referred to herein as a consumer or accountholder, who uses the transaction card to tender payment for a purchase from merchant 24. To accept payment with the transaction card, merchant 24 normally establishes an account with a financial institution that is part of the financial payment system. This financial institution is referred to as the "merchant bank," the "acquiring bank," or the "acquirer." In one embodiment, accountholder 22 tenders payment for a purchase using a transaction card at a transaction processing device 40 (e.g., a point of sale device), and merchant 24 then requests authorization from a merchant bank 26 for the amount of the purchase. The request is usually performed through the use of a point-of-sale terminal, which reads account information from a magnetic stripe, a chip, embossed characters, and the like, included on the transaction card of the accountholder 22 and communicates electronically with the transaction processing computers of merchant bank 26. In the context of transactions with online merchants, an accountholder 22 may provide their account information, such as their account number, a card verification number, an expiration date, and the like through a website. Alternatively, merchant bank 26 may authorize a third party to perform transaction processing on its behalf. In this case, the point-of-sale terminal may be configured to communicate with the third party. Such a third party may be referred to as a "merchant processor," an "acquiring processor," or a "third party processor."

Using an interchange network 28, computers of merchant bank 26 may communicate with computers of an issuer bank 30 to determine whether account 32 of accountholder 22 is in good standing and whether the purchase is covered by an available credit line of the account 32 corresponding to accountholder 22. Based on these determinations, the request for authorization may be declined or accepted. If the request is accepted, an authorization code may be issued to merchant 24.

Merchants, such as merchant 24 may store payment card account information corresponding to one or more accountholders in a merchant account information data source 36. In certain embodiments, the merchant account information data source 36 may be a local or remote database accessible by merchant 24. During a transaction, merchant 24 may retrieve account information from the merchant account information data source 36 as opposed to acquiring the information from accountholder 22, such as by having accountholder 22 provide his or her payment card account information by swiping a payment card or manually entering payment card information. So called "account-on-file" transactions may include recurring payments such as subscription fees, membership fees, electronic bills, and the like. Account-on-file transactions may also include instances when accountholder 22 is a repeat customer of merchant 24. Accordingly, account-on-file transactions generally require an accountholder to provide his or her payment card account information initially and then to authorize or enroll in an account-on-file service. Once enrolled, subsequent payments by accountholder 22 may be streamlined by either automatically charging accountholder 22 or by automatically retrieving account information corresponding to accountholder 22 from merchant account information data source 36.

For example, merchant 24 may be an internet service provider (ISP) that provides internet connectivity to accountholder 22 in exchange for a monthly service fee. Accountholder 22 may enroll in an automatic bill pay service with the ISP to pay for the monthly service charge. The ISP may store accountholder 22's account data in merchant account information data source 36. When the monthly service charge is due, the ISP may retrieve the account data from merchant account information data source 36 and may submit a transaction based on the retrieved account data to issuer 30. As another example, merchant 24 may be an online merchant from which accountholder 22 makes regular purchases. Accountholder 22 may create a user profile with the online merchant and provide his or her payment card account information, which the online merchant may then store in merchant account information data source 36. When accountholder 22 later logs onto the online merchant's website and selects goods or services for purchase, the online merchant may retrieve accountholder 22's payment card account data and facilitate accountholder 22's purchase by automatically populating purchase forms or performing similar steps with the retrieved account data.

Although account-on-file transactions provide improved efficiency for both merchants and accountholders, payment card account information is subject to change. For example, a payment card's expiration date may lapse or an issuing bank may reissue a payment card with a different primary account number (PAN). If merchant 24 attempts to submit a transaction to issuer 30 after such a change and uses out-of-date account information, issuer 30 is likely to reject the transaction. Accordingly, a subscriber ABU computing device 34 may be implemented to ensure that account data maintained by merchant 24 is current. Specifically, subscriber ABU computing device 34 may periodically receive payment card account information updates from one or more issuers, such as issuer 30, and store the received payment card account information in a subscriber ABU account information data source 38. Subscriber ABU computing device 34 may then make the stored payment card account information available to merchant 24 so that merchant 24 may update merchant account information data source 36.

In certain embodiments, subscriber ABU account information data source 38 may store payment card account information for one or more accountholders, such as accountholder 22. For each payment card account of an accountholder, subscriber ABU account information data source 38 may include current account information including, but not limited to, a current account identifier and a current expiration date. Subscriber ABU account information data source 38 may also store outdated account information that is linked to corresponding current account information. As a result, if an update request for current account information is submitted to the subscriber ABU computing device 34 using outdated account information, the subscriber ABU computing device 34 may locate the corresponding current account information in the subscriber ABU account information data source 38 based on the submitted outdated account information.

To obtain current account information, merchant 24 may submit a registration request to subscriber ABU computing device 34. The registration request may include one or more merchant identifiers, and one or more account identifiers for which merchant 24 is requesting current accountholder(s) payment card account information. In response to the registration request, subscriber ABU computing device 34 may verify merchant 24 is authorized to receive updated data. Upon verification, ABU computing device 24 may approve merchant 24 registration request, returning a registration acceptance response to merchant 24.

In response to the registration request, subscriber ABU computing device 34 may access payment card account data stored in subscriber ABU account information data source 38 using the merchant identifier and verifying merchant 24 is authorized to receive updated account data. Based on the verification, subscriber ABU computing device 34 may determine merchant 24 is authorized to receive updated account data and approve merchant 24 registration request, returning a registration acceptance response to merchant 24. Or, subscriber ABU computing device 34 may determine that merchant 24 is non-verified and deny merchant 24 registration request, returning a denial response to merchant 24. The registration acceptance and/or denial response may also be sent to issuer 30 by subscriber ABU computing device 34.

Additionally or alternatively, issuer 30 may set the subscription rules used by subscriber ABU computing device 34. Issuer 30 may send and provide subscription rules to an issuer rule information data source 44. Subscriber ABU computing device 34 may then verify merchant 24 is authorized to receive updated account data using the subscription rules received from issuer 30 and stored in issuer rule information data source 44. As such, issuer 30 may have different subscription rules for specific account ranges. For example, issuer 30 may provide a BIN with the payment card account data and use the BIN to identify high net worth accounts and average net worth accounts. Subscriber ABU computing device 34 may select the subscription rules used to verify merchant 24 is authorized to receive updated account data from a set of subscription rules based on the BIN. For example, issuer 30 may provide a more stringent set of s rules for BINs identifying higher net worth accounts of accountholders 22 because they may be a larger target for fraudulent activity and/or have a higher account limit to draw from Subscriber ABU computing device 34 may verify merchant 24 is authorized to receive updated account data by applying at least one subscription rule derived from one or more data sets including account activity data, account fraud data, merchant activity data, merchant fraud data, and merchant feedback data stored in a fraud information data source 42. Fraud information data source 42 generally stores information regarding at least one of account activity, merchant activity, and fraud activity. Fraud information may be received from one or more fraud monitoring sources, such as MasterCard System to Avoid Fraud Effectively (SAFE), MasterCard Expert Monitoring System (EMS), or any other fraud monitoring source.

In certain embodiments, subscriber ABU computing device 34 may verify merchant 24 is authorized to receive updated account data by using subscription rules derived from the account data corresponding to accountholder's 22 payment card and stored in fraud information data source 42. For example, subscriber ABU computing device 34 may verify merchant 24 is authorized to receive updated account data by determining whether the account identifier has a predetermined fraud indicator derived from the account fraud data, stored in fraud information data source 42. The fraud indicator may include one or more of determining whether a current payment card transaction by merchant 24 exceeds a previous spend history for the transaction type by accountholder 22, and determining whether account chargeback history exceeds an account chargeback limit. If the predetermined fraud indicators for accountholder's 22 payment card are present, then subscriber ABU computing device 34 may determine that merchant 24 is non-verified and deny merchant 24 registration request, providing a registration denial response to merchant 24. However, if the predetermined fraud indicators for accountholder's 22 payment card are not present, then subscriber ABU computing device 34 may determine that merchant 24 is authorized to receive updated account data and approve merchant 24 registration request, providing a registration acceptance response to merchant 24.

In another example, subscriber ABU computing device 34 may verify merchant 24 is authorized to receive updated account data by determining whether the account identifier is on the account blacklist, stored in fraud information data source 42. If the account identifier is on the account blacklist, then subscriber ABU computing device 34 may determine that merchant 24 is non-verified and deny merchant 24 registration request, providing a registration denial response to merchant 24. However, if the account identifier is not on the account blacklist, then subscriber ABU computing device 34 may determine that merchant 24 is authorized to receive updated account data and approve merchant 24 registration request, providing a registration acceptance response to merchant 24. In a further example, subscriber ABU computing device 34 may verify merchant 24 is authorized to receive updated account data by determining whether a date of the account identifier exceeds a predetermined date limit. For example, if the account identifier provided by merchant 24 is more than the predetermined date limit, for example more than fifty (50) months old, then subscriber ABU computing device 34 may determine that merchant 24 is non-verified and deny merchant 24 registration request, providing a registration denial response to merchant 24. However, if the account identifier provided by merchant 24 is less than the predetermined date limit, then subscriber ABU computing device 34 may determine that merchant 24 is authorized to receive updated account data and approve merchant 24 registration request, providing a registration acceptance response to merchant 24.

In certain embodiments, subscriber ABU computing device 34 may verify that merchant 24 is authorized to receive updated account data by using subscription rules derived from the merchant activity data stored in fraud information data source 42. For example, subscriber ABU computing device 34 may verify merchant 24 is authorized to receive updated account data by determining whether merchant 24 has prior approved transactions, stored in fraud information data source 42, corresponding to accountholder's 22 payment card account data. If prior approved payment card transactions are not present between merchant 24 and accountholder 22, then subscriber ABU computing device 34 may determine that merchant 24 is non-verified and deny merchant 24 registration request, providing a registration denial response to merchant 24. However, if prior approved payment card transactions are present between merchant 24 and accountholder 22, then subscriber ABU computing device 34 may determine that merchant 24 is authorized to receive updated account data and approve merchant 24 registration request, providing a registration acceptance response to merchant 24.

In other embodiments, subscriber ABU computing device 34 may verify merchant 24 is authorized to receive updated account data by using subscription rules derived from the merchant fraud data stored in fraud information data source 42. For example, subscriber ABU computing device 34 may verify merchant 24 is authorized to receive updated data by determining whether a fraud chargeback count, derived from the merchant fraud data stored in fraud information data source 42, exceeds a predetermined fraud chargeback count limit. If the predetermined fraud chargeback count limit for merchant 24 is exceeded, then subscriber ABU computing device 34 may determine that merchant 24 is non-verified and deny merchant 24 registration request, providing a registration denial response to merchant 24. However, if the predetermined fraud chargeback count limit for merchant 24 is not exceeded, then subscriber ABU computing device 34 may determine that merchant 24 is authorized to receive updated account data and approve merchant 24 registration request, providing a registration acceptance response to merchant 24.

In another example, subscriber ABU computing device 34 may verify merchant 24 is authorized to receive updated account data by determining whether a fraud chargeback percentage, derived from the merchant fraud data stored in fraud information data source 42, exceeds a predetermined fraud chargeback percentage limit. If the predetermined fraud chargeback percentage limit for merchant 24 is exceeded, then subscriber ABU computing device 34 may determine that merchant 24 is non-verified and deny merchant 24 registration request, providing a registration denial response to merchant 24. However, if the predetermined fraud chargeback percentage limit for merchant 24 is not exceeded, then subscriber ABU computing device 34 may determine that merchant 24 is authorized to receive updated account data and approve merchant 24 registration request, providing a registration acceptance response to merchant 24. In a further example, subscriber ABU computing device 34 may verify merchant 24 is authorized to receive updated account data by determining whether merchant 24 is a common point of fraud that is derived from the merchant fraud data stored in fraud information data source 42. If merchant 24 is determined to be a common point of fraud, then subscriber ABU computing device 34 may determine merchant 24 is non-verified and deny merchant 24 registration request, providing a registration denial response to merchant 24. However, if merchant 24 is not determined to be a common point of fraud, then subscriber ABU computing device 34 may determine that merchant 24 is authorized to receive updated account data and approve merchant 24 registration request, providing a registration acceptance response to merchant 24.

In other embodiments, subscriber ABU computing device 34 may verify the registration of merchant 24 using subscription rules derived from the merchant blacklist stored in fraud information data source 42. For example, subscriber ABU computing device 34 may verify the registration of merchant 24 by determining whether merchant 24 is on the merchant blacklist. If merchant 24 is on the merchant blacklist, then subscriber ABU computing device 34 may determine that merchant 24 is non-verified and deny merchant 24 registration request, providing a registration denial response to merchant 24. However, if merchant 24 is not on the merchant blacklist, then subscriber ABU computing device 34 may determine that merchant 24 is authorized to receive updated account data and approve merchant 24 registration request, providing a registration acceptance response to merchant 24.

Subscriber ABU computing device 34 may also be configured to verify merchant 24 is authorized to receive updated account data by using subscription rules derived from merchant feedback data stored in fraud information data source 42. During transaction authorization requests between issuer 30 and merchant 24, issuer 30 may include an advice code in the authorization response that provides instructions to merchant 24. For example, issuer 30 may request via DE48.84 that merchant 24 take a particular action regarding the payment card account data, such as a stop on maintaining accountholder's 22 account-on-file information. Subscriber ABU computer device 34 may record subsequent merchant 24 activities, such as the number of registration requests for the payment card account data sent by merchant 24 after the stop instruction. As such, subscriber ABU computing device 34 may look to the merchant feedback data to determine whether merchant 24 acted on the feedback data as an indicator of a non-fraudulent merchant 24.

For example, subscriber ABU computing device 34 may verify merchant 24 is authorized to receive updated account data by determining whether a feedback actioned count for merchant 24, derived from merchant feedback data stored in fraud information data source 42, exceeds a predetermined feedback actioned count limit. If the predetermined feedback actioned count limit for merchant 24 is exceeded, then subscriber ABU computing device 34 may determine that merchant 24 is non-verified and deny merchant 24 registration request, providing a registration denial response to merchant 24. However, if the predetermined feedback actioned count limit for merchant 24 is not exceeded, then subscriber ABU computing device 34 may determine that merchant 24 is authorized to receive updated account data and approve merchant 24 registration request, providing a registration acceptance response to merchant 24. In another example, subscriber ABU computing device 34 may verify merchant 24 is authorized to receive updated account data by determining whether a feedback action percentage for merchant 24, derived from the merchant feedback data stored in fraud information data source 42, exceeds a predetermined feedback actioned percentage limit. If the predetermined feedback actioned percentage limit for merchant 24 is exceeded, then subscriber ABU computing device 34 may determine that merchant 24 is non-verified and deny merchant 24 registration request, providing a registration denial response to merchant 24. However, if the predetermined feedback actioned percentage limit for merchant 24 is not exceeded, then subscriber ABU computing device 34 may determine that merchant 24 is authorized to receive updated account data and approve merchant 24 registration request, providing a registration acceptance response to merchant 24.

Once merchant 24 registration request is approved, subscriber ABU computing device 34 may transmit updated account data to merchant 24. Subscriber ABU computing device 34 is configured to transmit updated account data to merchant 24 upon receiving an update request from merchant 24 and/or based on a predetermined event. For example, merchant 24 may submit an update request to subscriber ABU computing device 34 that may include one or more merchant identifiers, and one or more account identifiers for which merchant 24 is requesting current accountholder(s) payment card account information. In response to the update request, subscriber ABU computing device 36 may access payment card account data stored in subscriber ABU account information data source 38 using the merchant identifier. Subsequently, subscriber ABU computing device 34 may retrieve corresponding current account information from subscriber ABU account information data source 38 and transmit a response message containing the current account information to merchant 24.

In another example, subscriber ABU computing device 34 may automatically transmit a response message containing current account information to merchant 24 based on a predetermined event. In certain embodiments, subscriber ABU computing device 34 may retrieve current account information, associated with merchant 24, from subscriber ABU account information data source 38 upon receiving updated account data from issuer 30. Subsequently, subscriber ABU computing device 34 may transmit a message containing current account information to merchant 24. In other embodiments, subscriber ABU computing device 34 may retrieve current account information, associated with merchant 24, from subscriber ABU account information data source 38 based on a predetermined schedule. For example, subscriber ABU computing device 34 may be configured to transmit a message containing current account information to merchant 24 on a daily basis.

In some embodiments, subscriber ABU computing device 34 may accumulate updated account data and submit a batch of updated account data to merchant 24. Subscriber ABU computing device 34 may transmit the batch of updated account data to merchant 24 using an interface that may consist of batch file endpoints and/or REST (Representational State Transfer) endpoints. In certain embodiments, the subscriber ABU computing device 34 may automatically transmit the batch of updated account data to merchant 24 based on a predetermined event. In other embodiments, the subscriber ABU computing device 34 may transmit the batch to merchant 24 upon receiving an update request from merchant 24.

In alternative embodiments, subscriber ABU computing device 24 may authenticate that merchant 24 is currently authorized to receive updated account data. Based on the authentication, subscriber ABU computing device 34 may determine merchant 24 is currently authorized to receive updated account data, and may generate and transmit an update message containing the current payment card account data to merchant 24. Or, subscriber ABU computing device 34 may determine that merchant 24 is no longer authorized to receive updated account data and deny access to the updated account data to merchant 24. Subscriber ABU computing device 34 may generate and transmit a denial message stating that access to updated account data is denied to merchant 24. The update message and/or denial message may also be sent to issuer 30 by subscriber ABU computing device 34.

In another example, subscriber ABU computing device 34 may authenticate that merchant 24 is authorized to receive updated account data by determining whether an update request from merchant 24 was received beyond a predefined time period since a last approved transaction corresponding to accountholder's 22 payment card account data. If the last approved transaction between merchant 24 and accountholder 22 occurred beyond a predetermined time period, for example twenty-four (24) months, from the update request, then subscriber ABU computing device 34 may determine that merchant 24 is no longer authorized to receive updated account data and deny access to the updated account data to merchant 24, returning a denial message stating that access to updated account data is denied to merchant 24. However, if the last approved transaction between merchant 24 and accountholder 22 occurred within the predetermined time period, then subscriber ABU computing device 34 may determine that merchant 24 is authorized to receive updated account data, and may generate and transmit an update message containing the current payment card account data to merchant 24.

In certain embodiments, merchant bank 26 may accumulate update requests and submit a batch of update requests to subscriber ABU computing device 34. In other embodiments, the subscriber ABU computing device 34 may, for each update request in the batch, transmit a response to a corresponding merchant. In other embodiments, the subscriber ABU computing device 34 may accumulate all relevant current account information into a response batch and transmit the response batch to merchant bank 26. Merchant bank 26 may then distribute the account information as required to each merchant that previously submitted an update request.

Example of a Subscriber Account Billing Updater System

Figure 2:
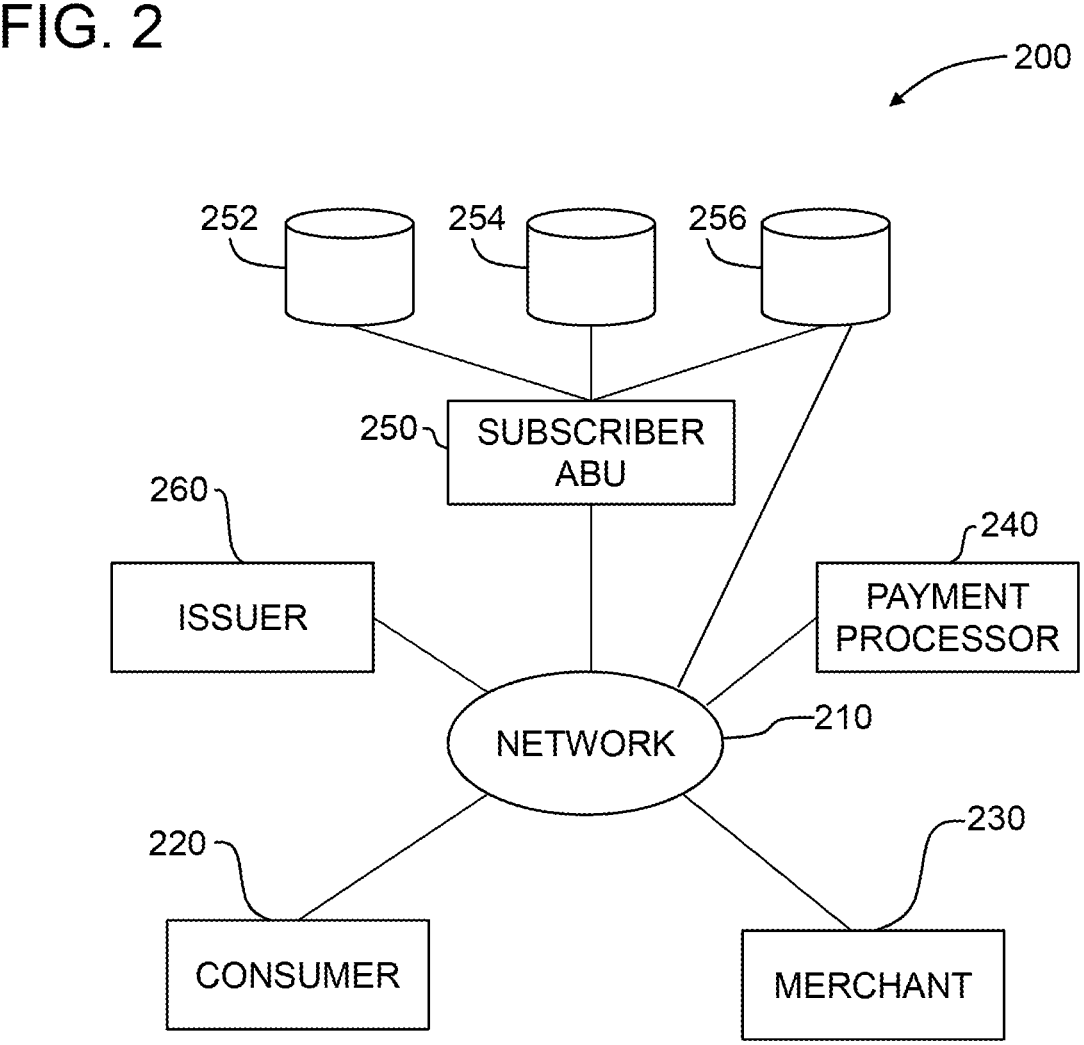

FIG. 2 is a diagram illustrating a subscriber account-on-file billing updater (ABU) system 200 including a consumer, a merchant, a payment processor, an issuer, and a subscriber ABU, which may correspond to subscriber ABU computing device 34 (shown in FIG. 1), in accordance with an example embodiment of the present disclosure.

Referring to FIG. 2, subscriber ABU system 200 includes computing devices that respectively represent a consumer 220, a merchant 230, a payment processor 240, a subscriber ABU 250, and an issuing bank ("issuer") 260 which are connected to each other via network 210. Network 210 may include the Internet, the interchange network 28 of FIG. 1, and/or one or more other networks. For example, a connection between the computing devices may include a wireless network, a wired network, a telephone network, a cable network, a combination thereof, and the like. Examples of a wireless network include networks such as WiFi, WiMAX, WiBro, local area network, personal area network, metropolitan area network, cellular, Bluetooth, and the like.

Consumer 220 may be a computing device, for example, a mobile phone, a smart phone, a telephone, a computer, a laptop, a desktop, a tablet, an MP3 player, a digital assistant, a server, and the like. Consumer 220 may access a website that corresponds to or is hosted by the merchant 230, and/or may contact a phone number of merchant 230, and the like. Payment processor 240 may be a processing entity such as MASTERCARD®, VISA®, AMERICAN EXPRESS®, and the like. Issuer 260 may be a third-party bank that issued a payment card to a cardholder. For example, issuer 260 may correspond to payment processor 240.

Merchant 230 corresponds to a computing device configured to accept and process payment card transactions and to maintain a merchant account information data source, such as a database, that includes payment card account data associated with one or more cardholders. The merchant account information data source may be incorporated into merchant 230 or may be otherwise accessible by merchant 230 via a network, such as network 210. The information maintained in the merchant account information data source may generally be used to facilitate account-on-file transactions, such as automatic recurring payments.

Subscriber ABU 250 is generally configured to receive account data from an issuing party, such as issuer 260, to store the account data, and to provide the account data to a requesting party, such as merchant 230. Subscriber ABU 250 is further configured to manage and verify merchant 230 is authorized to receive updated account data before registering merchant 230 as authorized to receive updated account data and before providing up-to-date account data to merchant 230.

Subscriber ABU 250 may include or have access to one or more data sources to facilitate management of the subscriber ABU system 200. For example, in the embodiment of FIG. 2, subscriber ABU 250 may have access to an account information data source 252, a fraud information data source 254, and an issuer rule information data source 256. Each of account information data source 252, fraud information data source 254, and issuer rule information data source 256 may be internal storage of subscriber ABU 250 or may be remote to but accessible by subscriber ABU 250. Each of account information data source 252, fraud information data source 254, and issuer rule information data source 256 may be stored on one or more data storage devices in one or more databases, tables, or similar storage structures.

Account information data source 252 contains account data received from one or more issuing parties, such as issuer 260. Account information data source 252 may be updated by subscriber ABU 250 in response to receiving account data from issuer 260 over network 210. In certain embodiments, the account data may be sent by issuer 260 according to a predetermined event. In other embodiments, subscriber ABU computing device 250 may make a call to issuer 260 and account data may be sent by issuer 260 to subscriber ABU 250 in response to the call. In still other embodiments, issuer 260 may automatically send account data to subscriber ABU computing device 250 upon changes to account data associated with one or more accountholders.

Subscriber ABU 250 generally registers requesting parties, such as merchant 230, upon receiving a registration request. Registration requests may be received over network 210 directly from merchant 230. Registration requests generally include one or more merchant identifiers, and one or more account identifiers for which merchant 230 is requesting current accountholder(s) payment card account information. In response to the registration request, subscriber ABU 250 may verify merchant 230 is authorized to receive updated data. Upon verification, ABU 250 may approve merchant 230 registration request, returning a registration acceptance response to merchant 230. Or, subscriber ABU 250 may determine that merchant 230 is non-verified and deny merchant 230 registration request, returning a denial response to merchant 230. The registration acceptance and/or denial response may also be sent to issuer 260 by subscriber ABU 250.

In conjunction with the registration request, subscriber ABU 250 may create an entry or update an existing entry in fraud information data source 254. Fraud information data source 254 generally stores account activity data, account fraud data, merchant activity data, and merchant fraud data corresponding to the subscription rules for merchant registration verification. In certain embodiments, subscriber ABU 250 may receive fraud data from one or more fraud monitoring sources, such as MasterCard System to Avoid Fraud Effectively (SAFE), MasterCard Expert Monitoring System (EMS), or any other fraud monitoring source, and store the data in fraud information data source 254.

Subscriber ABU 250 may be configured to receive subscription rules transmitted over network 210 by the issuer 260 to issuer rule information data source 256. For example, the issuer 260 may transmit subscription rules to issuer rule information data source 256. In response, subscriber ABU 250 receives the subscription rules and applies the subscription rules to verify merchant 230 is authorized to receive updated account data.

Subscriber ABU 250 may also be configured to receive messages transmitted over network 210 during a payment card transaction. For example, in certain embodiments subscriber ABU 250 may receive authorization messages such as authorization request messages sent from merchant 230 to issuer 260 and/or authorization response messages sent from issuer 260 to merchant 230. As subscriber ABU 250 processes transaction messages, subscriber ABU 250 may create or update entries in fraud information data source 254. In certain embodiments fraud information data source 254 may include entries corresponding to account-on-file transactions. For example, fraud information data source 254 may include one or more of a payment card number, a payment card expiration date, a merchant identifier, an amount, a date/time, a description of the goods/services purchased and the like. Subscriber ABU 250 may also use fraud information data source 254 to track when feedback messages are included in the transaction messages. Accordingly, fraud information data source 254 may include an advice code field indicating what one or more types of feedback were transmitted to merchant 230 from issuer 260.

Subscriber ABU 250 may be further configured to generate and transmit reports based on data stored in any of subscriber ABU account information data source 252, fraud information data source 254, and issuer rule information data source 256. Reports may be generated and provided for one or more parties, including but not limited to issuers, cardholders, merchants, acquirers, and issuing banks, and may contain different data depending on the party for which the report is generated. For example, subscriber ABU 250 may generate a report for an issuer that lists all merchants that had registration denials for specific accounts identifiers and the subscription rule that denied the registration. In another example, subscriber ABU 250 may generate a report for a merchant indicating if the merchant is on the blacklist.

Reports may take various forms. For example, in certain embodiments, reports generated by subscriber ABU 250 may be created as a document in a markup language, such as extensible markup language (XML). In other embodiments, reports may be generated as messages that conform to one or more standards. Such standards may include, but are not limited to ISO 8583 and ISO 20022, which generally provide for the format and content of messages related to electronic transactions made by accountholders using payment cards and messages transmitted between financial institutions, respectively. In still other embodiments, reports may be generated in a format compatible with and inserted into other messages transmitted over network 210. For example, subscriber ABU 250 may generate a report suitable for insertion into an authentication request or response message sent between a merchant and an issuer over network 210.

Subscriber ABU 250 is further configured to transmit updated account data to merchant 230 once merchant 230 registration request is approved. Subscriber ABU 250 may transmit updated account data upon receiving an update request from merchant 230 and/or based on a predetermined event. Update requests may be received over network 210 directly from merchant 230 or may be batched together by an acquirer, such as merchant bank 26 of FIG. 1, and transmitted to subscriber ABU 250 in a batched format. Update requests generally include one or more merchant identifiers, and one or more account identifiers for which merchant 230 is requesting current accountholder(s) payment card account information. In response to the update request, subscriber ABU 250 access payment card account data stored in account information data source 252 using the merchant identifier. Subsequently, subscriber ABU 250 may retrieve corresponding current account information from account information data source 252 and transmit a response message containing the current account information to merchant 230.

In another embodiment, subscriber ABU 250 is configured to automatically transmit a response message containing current account information to merchant 230 based on a predetermined event. In certain embodiments, subscriber ABU 250 may retrieve current account information, associated with merchant 230, from account information data source 252 upon receiving updated account data from issuer 260. Subsequently, subscriber ABU 250 may transmit a message containing current account information to merchant 230. In other embodiments, subscriber ABU 250 may retrieve current account information, associated with merchant 230, from account information data source 252 based on a predetermined schedule. For example, subscriber ABU 250 may be configured to transmit a message containing current account information to merchant 230 on a daily basis.

In certain embodiments, subscriber ABU 250 may accumulate updated account information and submit a batch of updated account information to merchant 230. In alternative embodiments, the subscriber ABU 250 may transmit the batch to merchant 230 upon receiving an update request from merchant 230. In other embodiments, the subscriber ABU 250 may automatically transmit the batch to merchant 230 based on a predetermined event.

In alternative embodiments, subscriber ABU 250 may authenticate that merchant 230 is currently authorized to receive updated account data. Based on the authentication, subscriber ABU 250 may determine merchant 230 is currently authorized to receive updated account data, and may generate and transmit an update message containing the current payment card account data to merchant 230. Or, subscriber ABU 250 may determine that merchant 230 is no longer authorized to receive updated account data and deny access to the updated account data to merchant 230. Subscriber ABU 250 may generate and transmit a denial message stating that access to updated account data is denied to merchant 230. The update message and/or denial message may also be sent to issuer 260 by subscriber 250.

Example of a Subscriber ABU Computing Device

Figure 3:
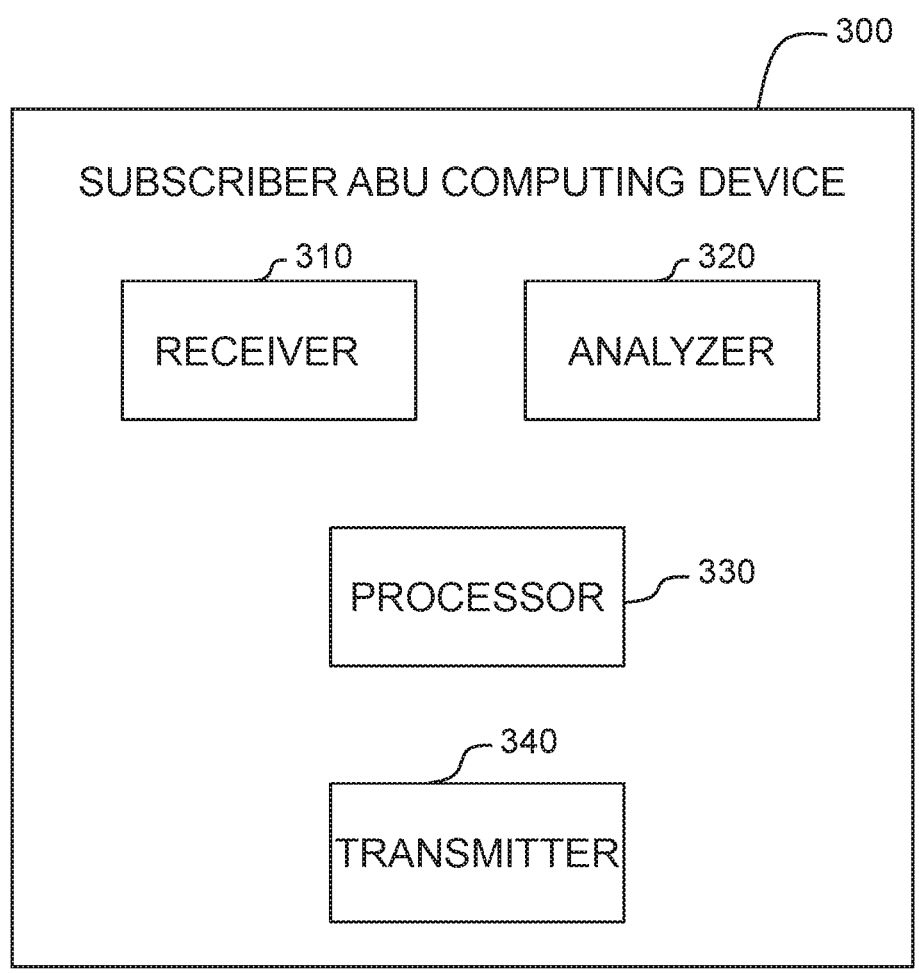

FIG. 3 is a diagram illustrating an example embodiment of a subscriber account-on-file billing updater (ABU) computing device that may be included in the subscriber ABU system of FIG. 2, in accordance with an example embodiment of the present disclosure.

Referring to FIG. 3, subscriber ABU computing device 300 may correspond to device authenticator 250 shown in FIG. 2. Subscriber ABU computing device 300 may be coupled to payment processor 240 or may be a separate computing device included in the system of FIG. 2, and may be connected to one or more of the other computing devices via the network 210. In this example, subscriber ABU computing device 300 includes a receiver 310, an analyzer 320, a processor 330, and a transmitter 340. Subscriber ABU computing device 300 may include additional components not shown, or less than the amount of components shown. Also, one or more of the components in this example may be combined or may be replaced by processor 330. The computer components described herein (e.g., receiver 310; analyzer 320; processor 330; and transmitter 340) may include hardware and/or software that are specially configured or programmed to perform the steps described herein.

Receiver 310 is generally configured to receive account data from one or more issuers, such as issuer 260 of FIG. 2. Such account data may include, but is not limited to, payment card account numbers, payment card account expiration dates, and the like. Receiver 310 may also be configured to retrieve account data from various data sources. For example, receiver 310 may receive account data from each of account information data source 252, fraud information data source 254, and issuer rule information data source 256 as depicted in FIG. 2. Receiver 310 may also be configured to receive update requests for account data stored in account information data source 252 from one or more requesting parties, such as a merchant. Receiver 310 may also be configured to receive fraud data stored in fraud information data source 254 from one or more fraud monitoring sources, such as MasterCard System to Avoid Fraud Effectively (SAFE), MasterCard Expert Monitoring System (EMS), or any other fraud monitoring source. Receiver 310 may also be configured to receive subscription rules stored in issuer rule information data source 256 from an issuer. In certain embodiments, receiver 310 may also be configured to receive messages sent over an interchange network, such as network 210 of FIG. 2, which may include, but are not limited to, authorization request and response messages. Messages and account data received by receiver 310 may be in a batch format that aggregates multiple messages or data from multiple accounts. Accordingly, receiver 310 may be configured to parse individual messages and account data entries from such batched formats.

Analyzer 320 analyzes data and messages received through receiver 310. Analyzer 320 generally determines the type of data or message received and identifies how the data or message is to be processed by processor 330. In certain embodiments, analyzer 320 may determine whether data or messages received by receiver 310 include flags or other indicators that identify the type of data or message received by receiver 310. For example, the indicator may identify the message as one of an update request, fraud data, or a transaction-related message such as an authorization request or authorization response message.

After analysis by analyzer 320, processor 330 may further analyze and process data and messages received by receiver 310 and perform additional ABU-related functions.

In response to receiving an account data update from an issuing party, processor 330 may generally update an account information data source. For example, processor 330 may determine whether the account data update received from the issuing party includes account data corresponding to an account for which data is maintained in the account information data source. Processor 330 may also compare any existing data with that of the account data update to determine if any changes have occurred. Finally, processor 330 may add new entries to account information data source for any data corresponding to new accounts or overwrite any outdated data for existing accounts. Data recorded by processor 330 in account information data source may include, but is not limited to, an account number and an expiration date.

When updating existing records in the account information data source, processor 330 may also populate data fields or create records for the account data being overwritten. Such fields or records may be cross-referenced or otherwise linked to the corresponding updated account data received from the issuing party. Doing so permits subscriber ABU computing device 300 to identify current account data corresponding to outdated account data that may be submitted by a requesting party.

In response to receiving a registration request from a merchant, processor 330 may verify the merchant is authorized to receive updated account data using at least one subscription rule and determine that the merchant is authorize to receive updated account data. More specifically, processor 330 may determine what account data is being requested and determine at least one subscription rule to apply, apply the at least one subscription rule, determine if the merchant is authorized to receive updated account data, approve the registration request, and generate a registration acceptance or denial response for transmission by transmitter 340.

In certain embodiments, processor 330 may select the subscription rules from a set of subscription rules based on a bank identification number (BIN) that is included in the account data. For example, the processor 330 may verify a merchant is authorized to receive updated account data by applying at least one subscription rule for determining the merchant is authorized to receive updated account data that includes at least one of determining that the merchant has prior approved transactions corresponding to the account identifier, and determining that the registration request sent by the merchant was received within a predetermined time period since a last approved transaction corresponding to the account identifier.

Processor 330 may verify the merchant is authorized to receive updated account data by applying at least one subscription rule for determining the merchant derived from the merchant fraud data. For example, determining that a fraud chargeback count derived from the merchant fraud data is within a predetermined fraud chargeback count limit; determining that a fraud chargeback percentage derived from the merchant fraud data is within a predetermined fraud chargeback percentage limit; and determining that the merchant is not a common point of fraud.

In certain embodiments, processor 330 may verify the merchant is authorized to receive updated account data by applying at least one subscription rule for determining the merchant derived from the account fraud data. For example, determining that the account identifier does not have predetermined fraud indicators derived from the account fraud data; determining that the account identifier is not on an account blacklist; and determining that a date of the account identifier is within a predetermined date limit.

Processor 330 may verify the merchant is authorized to receive updated account data by applying at least one subscription rule for determining the merchant derived from the advice code data. For example, determining that a feedback actioned count derived from the advice code is within a predetermined feedback actioned count limit, and determining that a feedback actioned percentage derived from the advice code is within a predetermined feedback actioned percentage limit. In some embodiments, processor 330 may verify the merchant is authorized to receive updated account data by applying at least one subscription rule for determining the merchant derived from the merchant blacklist, for example determining that the merchant is not on the merchant blacklist.

In addition to processing account data, processor 330 may also create or update entries in a fraud information data source. The fraud information data source may generally store information regarding account and/or merchant activity. Accordingly, for one or more payment card accounts processor 330 may create or modify records in the fraud information data source indicating account activity data and/or account fraud data. Additionally, for one or more merchant identifier processor 330 may create or modify records in the fraud information data source indicating merchant activity data and/or merchant fraud data.

Processor 330 may also be configured to process subscription rules corresponding to the issuer's subscription rules within issuer rule information data source. Additionally, processor may generate update responses containing or based on data from one or more of the account information data source, the fraud information data source, and the issuer rule information data source.

In certain embodiments, subscriber ABU computing device 300 may also include a transmitter 340 for transmitting data, including, but not limited to registration acceptance/denial responses, update response messages and requests/queries for account data from one or more of an account information data source, a fraud information data source, and an issuer rule information data source.

Example Methods for Maintaining and Verifying Account-On-File Information

FIG. 4 is a diagram illustrating an example of a method 400 for maintaining and verifying account-on-file information that may be performed by a subscriber account-on-file billing updater (ABU) computing device in communication with at least one memory device, such as subscriber ABU computing device 300 of FIG. 3.

Initially, the subscriber ABU computing device may receive updated account data along with at least one subscription rule from an issuer 402, which may be an issuing bank. The updated account data may correspond to a cardholder, such as an accountholder. At least one subscription rule may be provided for verifying that a merchant is authorized to receive the current account data. The subscriber ABU computing device may request the updated account data along with at least one subscription rule from the issuer, or the issuer may transmit the current account data along with at least one subscription rule to the subscriber ABU computing device without a request.

The subscriber ABU computing device may then store the updated account data in first data store 404 and the at least one subscription rule in a second data store 406. In one embodiment, the first data store and the second data store may be in separate account information data sources. In another embodiment, the first data store and the second data store may be in one single account information data source. Storing the updated account data and the at least one subscription rule in the account information data source may include creating new entries or overwriting existing entries in the account information data source. Storing the updated account data may also include updating corresponding data fields such as a last date/time updated and/or outdated account data.

The subscriber ABU computing device may receive registration request from a requesting merchant 408. The registration request may include at least one candidate account identifier and one merchant identifier, wherein the each merchant identifier identifies a merchant requesting registration verification of the corresponding account identifier. In response to receiving registration request, the subscriber ABU computing device may retrieve the at least one subscription rule from the second data store after matching the candidate account identifier to the updated account identifier 410. The subscriber ABU computing device may apply the at least one subscription rule to the requesting merchant 412 to determine that the merchant is authorized to receive the updated account data 414.

In certain embodiments, the subscriber ABU computing device may select the subscription rules from a set of subscription rules based on a bank identification number (BIN) that is included in the account data. For example, the subscriber ABU computing device may verify the merchant is authorized to receive updated account data by applying at least one subscription rule that includes at least one of determining that the merchant has prior approved transactions corresponding to the account identifier, and determining that the update request sent by the merchant was received within a predetermined time period since a last approved transaction corresponding to the account identifier.

The subscriber ABU computing device may also receive merchant fraud data from a fraud monitoring source and verify the registration request by applying at least one subscription rule for determining the merchant derived from the merchant fraud data. For example, determining that a fraud chargeback count derived from the merchant fraud data is within a predetermined fraud chargeback count limit; determining that a fraud chargeback percentage derived from the merchant fraud data is within a predetermined fraud chargeback percentage limit; and determining that the merchant is not a common point of fraud.

In certain embodiments, the subscriber ABU computing device may receive account fraud data from the fraud monitoring source and verify the merchant is authorized to receive updated account data by applying at least one subscription rule for determining the merchant derived from the account fraud data. For example, determining that the account identifier does not have predetermined fraud indicators derived from the account fraud data; determining that the account identifier is not on an account blacklist; and determining that a date of the account identifier is within a predetermined date limit.

The subscriber ABU computing device may also receive an advice code corresponding to a payment card transaction response between the issuer and the merchant and store the advice code. Verifying the merchant is authorized to receive updated account data may occur by applying at least one subscription rule for determining the merchant derived from the advice code data. For example, determining that a feedback actioned count derived from the advice code is within a predetermined feedback actioned count limit, and determining that a feedback actioned percentage derived from the advice code is within a predetermined feedback actioned percentage limit.

In some embodiments, the subscriber ABU computing device may receive a merchant blacklist and verify the merchant is authorized to receive updated account data by applying at least one subscription rule for determining the merchant derived from the merchant blacklist, for example, determining that the merchant is not on the merchant blacklist. In other embodiments, the subscriber ABU computing device may receive the subscription rules from the issuer.

The subscriber ABU computing device may determine that the merchant is authorized to receive updated account data and approve the registration request, generating and transmitting a registration acceptance response and an update response to the merchant 416, or the subscriber ABU computing device may determine that the merchant is non-verified and deny the registration request, generating a registration denial response to the merchant.

Additional Considerations

Computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, the terms "card," "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transaction card can be used as a method of payment for performing a transaction. In addition, consumer card account behavior can include, but is not limited to, purchases, management activities (e.g., balance checking), bill payments, achievement of targets (meeting account balance goals, paying bills on time), and/or product registrations (e.g., mobile application downloads).

For example, one or more computer-readable storage media may include computer-executable instructions embodied thereon for maintaining account-on-file information. In this example, the computing device may include a memory device and a processor in communication with the memory device, and when executed by said processor, the computer-executable instructions may cause the processor to perform a method, such as the methods described and illustrated in the examples of FIGS. 4-6.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example, the system is executed on a single computer system, without a connection to a server computer. In a further example, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for managing access to data stored within a data source, said method implemented using a subscriber account-on-file billing updater (ABU) computing device and at least one payment interchange network computing device, the subscriber ABU computing device comprising at least one processor in communication with at least one memory device and a subscriber ABU account information data source, said method comprising:
    receiving, by the at least one payment interchange network computing device from an issuer, a plurality of authorization response messages, each authorization response message i) corresponding to a payment transaction originating at a respective merchant by a cardholder, and ii) including transaction data including a merchant identifier associated with the respective merchant, an account identifier associated with an account of the cardholder, a transaction amount associated with the payment transaction, and one of an approval and a denial of the payment transaction by the issuer;
    storing, by the at least one payment interchange network computing device, the transaction data from the plurality of authorization response messages in the data source;
    executing, by the at least one processor, a receiver, an analyzer, and a transmitter;
    receiving, by the receiver from the issuer, first updated account data including a first updated account identifier associated with the account, corresponding outdated account information associated with the account, and at least one subscription rule for verifying that a merchant is authorized to receive the first updated account data for the account associated with the first updated account identifier;
    storing, by the at least one processor, the first updated account data in a first data store of the subscriber ABU account information data source;
    storing, by the at least one processor, the at least one subscription rule in a second data store of the subscriber ABU account information data source, wherein the at least one subscription rule includes an instruction to automatically accept registration requests from merchants if a prior transaction between the corresponding merchant and the cardholder was approved by the issuer;
    receiving, by the receiver, a registration request from a requesting merchant including a candidate account identifier for which account updates are requested and a candidate merchant identifier identifying the requesting merchant;
    determining, by the analyzer, that the candidate account identifier corresponds to the outdated account information in the first data store;
    retrieving, by the receiver in response to determining that the candidate account identifier corresponds to the outdated account information, the at least one subscription rule from the second data store;
    applying, by the at least one processor, the at least one subscription rule to the requesting merchant by identifying, by the at least one processor, from the transaction data stored in the data source, at least one prior approved transaction including the merchant identifier matching the candidate merchant identifier of the requesting merchant and the account identifier matching the candidate account identifier submitted by the requesting merchant;
    in response to identifying the at least one prior approved transaction, automatically registering, by the at least one processor, the requesting merchant to receive updates corresponding to the candidate account identifier, the automatic registration including adding the candidate merchant identifier to a list of subscribed merchants associated with the account and stored in the data source;
    transmitting, by the transmitter, an update response to the requesting merchant including the first updated account data corresponding to the candidate account identifier;
    receiving, by the receiver, second updated account data including a second updated account identifier associated with the account, and corresponding updated outdated account information associated with the account;
    retrieving, by the at least one processor from the data source, the list of subscribed merchants associated with the account; and
    automatically transmitting, by the transmitter, the second updated account data to the merchants in the list of subscribed merchants, including the requesting merchant.

2. The method of claim 1, wherein the first updated account data includes a bank identification number (BIN) and the at least one subscription rule for determining the requesting merchant.

3. The method of claim 1 further comprising receiving party fraud data from a fraud monitoring source, wherein the at least one subscription rule for determining that the requesting merchant is authorized to receive the first updated account data further includes a rule derived from the party fraud data.

4. The method of claim 1, wherein the first updated account data includes a plurality of updated account identifiers and a plurality of merchant identifiers, and wherein the first data store and the second data store are the same.

5. The method of claim 1, wherein the at least one subscription rule includes a transmission rule defined by the issuer that instructs the subscriber ABU computing device to transmit the update response to the requesting merchant in response to an update request being submitted by the requesting merchant or transmit the update response to the requesting merchant in response to a predetermined event occurring.

6. A subscriber account-on-file billing updater (ABU) system comprising a subscriber ABU computing device and at least one payment interchange network computing device, the subscriber ABU computing device comprising at least one processor in communication with at least one memory device and a subscriber ABU account information data source, said subscriber ABU system configured to:
   receive, by the at least one payment interchange network computing device from an issuer, a plurality of authorization response messages, each authorization response message i) corresponding to a payment transaction originating at a respective merchant by a cardholder, and ii) including transaction data including a merchant identifier associated with the respective merchant, an account identifier associated with an account of the cardholder, a transaction amount associated with the payment transaction, and one of an approval and a denial of the payment transaction by the issuer;
   store, by the at least one payment interchange network computing device, the transaction data from the plurality of authorization response messages in a data source;
   execute, by the at least one processor, a receiver, an analyzer, and a transmitter;
   receive, by the receiver from the issuer, first updated account data including a first updated account identifier associated with the account, corresponding outdated account information associated with the account, and at least one subscription rule for verifying that a merchant is authorized to receive the first updated account data for the account associated with the first updated account identifier;
   store, by the at least one processor, the first updated account data in a first data store of the subscriber ABU account information data source;
   store, by the at least one processor, the at least one subscription rule in a second data store of the subscriber ABU account information data source, wherein the at least one subscription rule includes an instruction to automatically accept registration requests from merchants if a prior transaction between the corresponding merchant and the cardholder was approved by the issuer;
   receive, by the receiver, a registration request from a requesting merchant including a candidate account identifier for which account updates are requested and a candidate merchant identifier identifying the requesting merchant;
   determine, by the analyzer, that the candidate account identifier corresponds to the outdated account information in the first data store;
   retrieve, by the receiver in response to determining that the candidate account identifier corresponds to the outdated account information, the at least one subscription rule from the second data store;
   apply, by the at least one processor, the at least one subscription rule to the requesting merchant by identifying, by the at least one processor, from the transaction data stored in the data source, at least one prior approved transaction including the merchant identifier matching the candidate merchant identifier of the requesting merchant and the account identifier matching the candidate account identifier submitted by the requesting merchant;
   in response to identifying the at least one prior approved transaction, automatically register, by the at least one processor, the requesting merchant to receive updates corresponding to the candidate account identifier, the automatic registration including adding the candidate merchant identifier to a list of subscribed merchants associated with the account and stored in the data source;
   transmit, by the transmitter, an update response to the requesting merchant including the first updated account data corresponding to the candidate account identifier;
   receive, by the receiver, second updated account data including a second updated account identifier associated with the account, and corresponding updated outdated account information associated with the account;
   retrieve, by the at least one processor from the data source, the list of subscribed merchants associated with the account; and
   automatically transmit, by the transmitter, the second updated account data to the merchants in the list of subscribed merchants, including the requesting merchant.

7. The subscriber ABU computing device of claim 6, wherein the first updated account data includes a bank identification number (BIN) and the at least one subscription rule for determining the requesting merchant.

8. The subscriber ABU computing device of claim 6, wherein said subscriber ABU computing device is further configured to receive party fraud data from a fraud monitoring source, wherein the at least one subscription rule for determining that the requesting merchant is authorized to receive the first updated account data further includes a rule derived from the party fraud data.

9. The subscriber ABU computing device of claim 6, wherein the first updated account data includes a plurality of updated account identifiers and a plurality of merchant identifiers, and wherein the first data store and the second data store are the same.

10. The subscriber ABU computing device of claim 6, wherein the at least one subscription rule includes a transmission rule defined by the issuer that instructs the subscriber ABU computing device to transmit the update response to the requesting merchant in response to an update request being submitted by the requesting merchant or transmit the update response to the requesting merchant in response to a predetermined event occurring.

11. A non-transitory computer readable medium that includes first computer-executable instructions and second computer-executable instructions for managing access to data stored within a data source,
   wherein when the first computer-executable instructions are executed by at least one payment interchange network computing device, the first computer-executable instructions cause the at least one payment interchange network computing device to:
receive, from an issuer, a plurality of authorization response messages, each authorization response message i) corresponding to a payment transaction originating at a respective merchant by a cardholder, and ii) including transaction data including a merchant identifier associated with the respective merchant, an account identifier associated with an account of the cardholder, a transaction amount associated with the payment transaction, and one of an approval and a denial of the payment transaction by the issuer; and
store the transaction data from the plurality of authorization response messages in the data source; and
wherein when the second computer-executable instructions are executed by a subscriber account-on-file billing updater (ABU) computing device comprising at least one processor in communication with at least one memory device and a subscriber ABU account information data source, the second computer-executable instructions cause the subscriber ABU computing device to:
execute, by the at least one processor, a receiver, an analyzer, and a transmitter;
receive, by the receiver, first updated account data including a first updated account identifier associated with the account, corresponding outdated account information associated with the account, and at least one subscription rule for verifying that a merchant is authorized to receive the first updated account data for the account associated with the first updated account identifier;
store, by the at least one processor, the first updated account data in a first data store of the subscriber ABU account information data source;
store, by the at least one processor, the at least one subscription rule in a second data store of the subscriber ABU account information data source, wherein the at least one subscription rule includes an instruction to automatically accept registration requests from merchants if a prior transaction between the corresponding merchant and the cardholder was approved by the issuer;
receive, by the receiver, a registration request from a requesting merchant including a candidate account identifier for which account updates are requested and a candidate merchant identifier identifying the requesting merchant;
determine, by the analyzer, that the candidate account identifier corresponds to the outdated account information in the first data store;
retrieve, by the receiver in response to determining that the candidate account identifier corresponds to the outdated account information, the at least one subscription rule from the second data store;
apply, by the at least one processor, the at least one subscription rule to the requesting merchant by identifying, by the at least one processor, from the transaction data stored in the data source, at least one prior approved transaction including the merchant identifier matching the candidate merchant identifier of the requesting merchant and the account identifier matching the candidate account identifier submitted by the requesting merchant;
in response to identifying the at least one prior approved transaction, automatically register, by the at least one processor, the requesting merchant to receive updates corresponding to the candidate account identifier, the automatic registration including adding the candidate merchant identifier to a list of subscribed merchants associated with the account and stored in the data source;
transmit, by the transmitter, an update response to the requesting merchant including the first updated account data corresponding to the candidate account identifier
receive, by the receiver, second updated account data including a second updated account identifier associated with the account, and corresponding updated outdated account information associated with the account;
retrieve, by the at least one processor from the data source, the list of subscribed merchants associated with the account; and
automatically transmit, by the transmitter, the second updated account data to the merchants in the list of subscribed merchants, including the requesting merchant.

12. The computer readable medium of claim 11, wherein the first updated account data includes a bank identification number (BIN) and the at least one subscription rule for determining the requesting merchant.

13. The computer readable medium of claim 11, wherein the second computer-executable instructions further cause the subscriber ABU computing device to receive party fraud data from a fraud monitoring source, wherein the at least one subscription rule for determining that the requesting merchant is authorized to receive the first updated account data further includes derived from the party fraud data.

14. The computer readable medium of claim 11, wherein the first updated account data includes a plurality of updated account identifiers and a plurality of merchant identifiers, and wherein the first data store and the second data store are the same.

15. The computer readable medium of claim 11, wherein the at least one subscription rule includes a transmission rule defined by the issuer that instructs the subscriber ABU computing device to transmit the update response to the requesting merchant in response to an update request being submitted by the requesting merchant or transmit the update response to the requesting merchant in response to a predetermined event occurring.

* * * * *